United States Patent [19]
Mann et al.

[11] Patent Number: 5,796,344
[45] Date of Patent: Aug. 18, 1998

[54] IMMINENT ICING CONDITION ENUNCIATOR

[75] Inventors: Wayne L. Mann, Tualatin; Norman J. Petersen, Portland, both of Oreg.

[73] Assignee: Sprague Controls, Inc., Canby, Oreg.

[21] Appl. No.: 596,451

[22] Filed: Feb. 2, 1996

Related U.S. Application Data

[63] Continuation-in-part of Ser. No. 408,694, Mar. 21, 1995, abandoned.

[51] Int. Cl.$^6$ .................................................. G08B 19/02
[52] U.S. Cl. ........................ 340/583; 340/580; 340/905; 340/962
[58] Field of Search ........................... 340/905, 580, 340/583, 962, 601, 602, 581, 425.5, 901, 903, 904, 975

[56] References Cited

U.S. PATENT DOCUMENTS

| | | | |
|---|---|---|---|
| 3,201,750 | 8/1965 | Morin. | |
| 3,540,025 | 11/1970 | Levin et al. | |
| 4,274,091 | 6/1981 | Decker | 340/583 |
| 4,492,952 | 1/1985 | Miller. | |
| 4,634,294 | 1/1987 | Christol et al. | 374/170 |
| 4,690,553 | 9/1987 | Fukamizu et al. | 356/51 |
| 4,782,331 | 11/1988 | Martens | 340/583 |
| 4,953,093 | 8/1990 | Etoh | 364/426.04 |
| 4,965,573 | 10/1990 | Gallagher et al. | 340/968 |
| 5,014,042 | 5/1991 | Michoud et al. | 340/583 |
| 5,032,821 | 7/1991 | Domanico et al. | 340/440 |
| 5,122,796 | 6/1992 | Beggs et al. | 340/904 |
| 5,218,206 | 6/1993 | Schmitt et al. | 250/330 |
| 5,235,316 | 8/1993 | Qualizza | 340/903 |
| 5,276,326 | 1/1994 | Philpott | 340/968 |
| 5,313,202 | 5/1994 | Hansman, Jr. et al. | 340/581 |
| 5,416,476 | 5/1995 | Rendon | 340/905 |
| 5,436,741 | 7/1995 | Crandall | 340/475 |
| 5,521,594 | 5/1996 | Fukushima | 340/905 |

FOREIGN PATENT DOCUMENTS

| | | |
|---|---|---|
| 971652 | 7/1975 | Canada. |
| 55-147379 | 11/1980 | Japan. |
| 59-188545 | 10/1984 | Japan. |
| 59-202954 | 11/1984 | Japan. |
| 62-155138 | 7/1987 | Japan. |

*Primary Examiner*—Brent A. Swarthout
*Attorney, Agent, or Firm*—Dellett and Walters

[57] ABSTRACT

An imminent icing condition enunciator employs an infrared sensor with a focusing element to receive ambient infrared energy from a surface, particularly a road surface, and the output of the sensor is processed to provide an indication of imminent icing to the operator of, for example, an automobile or other vehicle. The device is suitably mounted to a vehicle, within a mirror enclosure so as to provide an unobstructed view of the roadway surface.

5 Claims, 9 Drawing Sheets

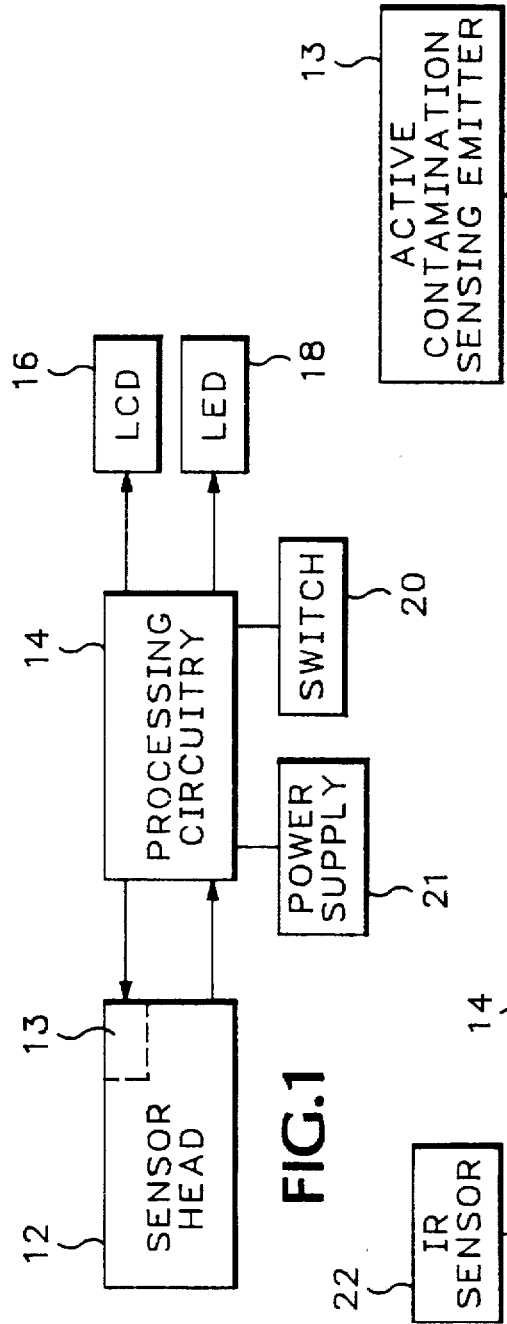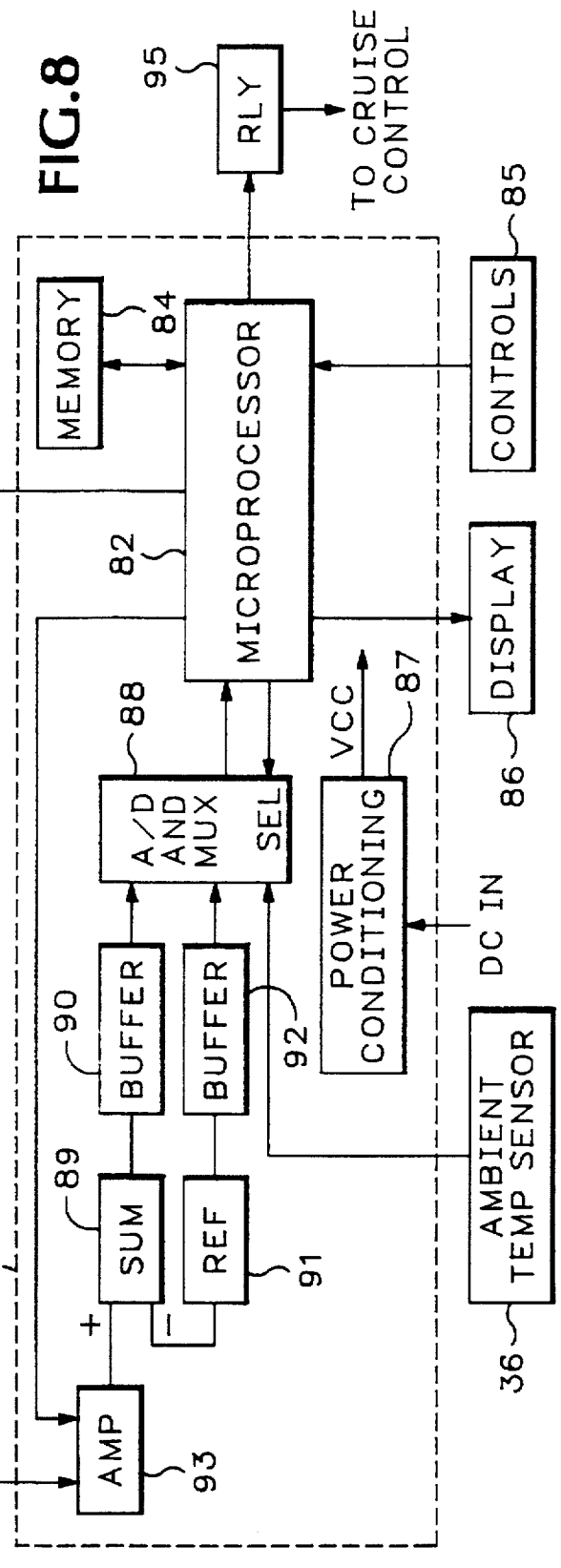

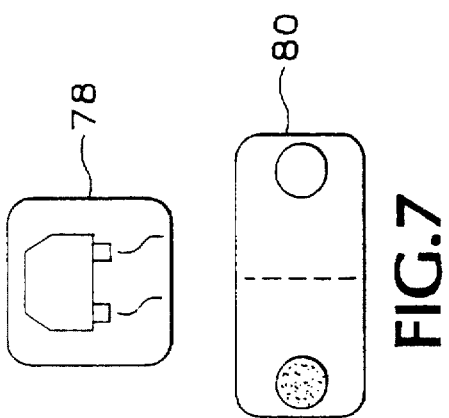
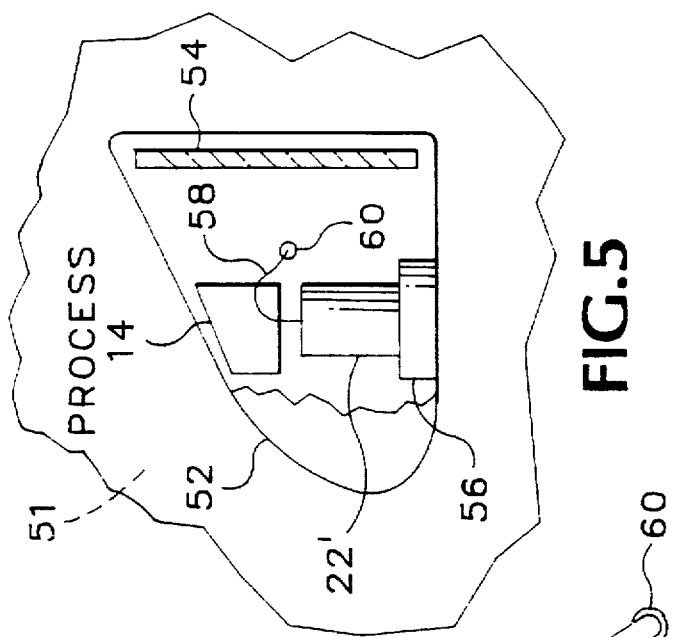
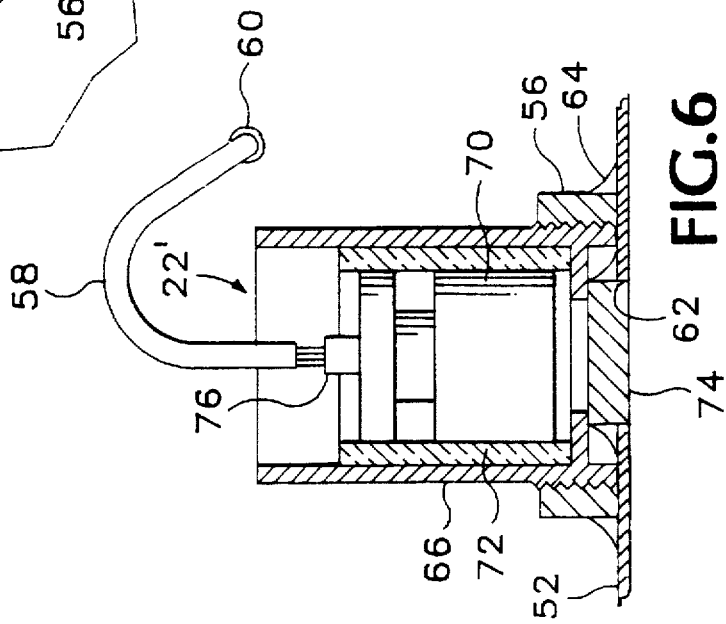

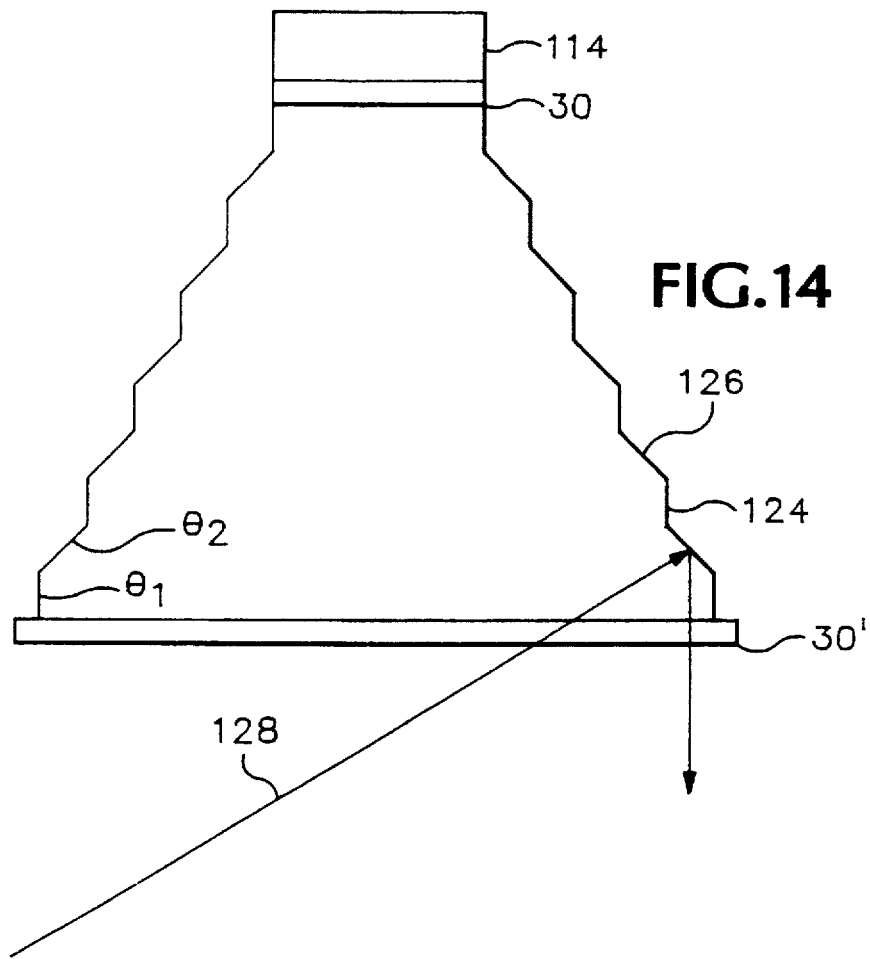
FIG.14
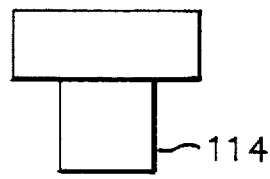
FIG.15
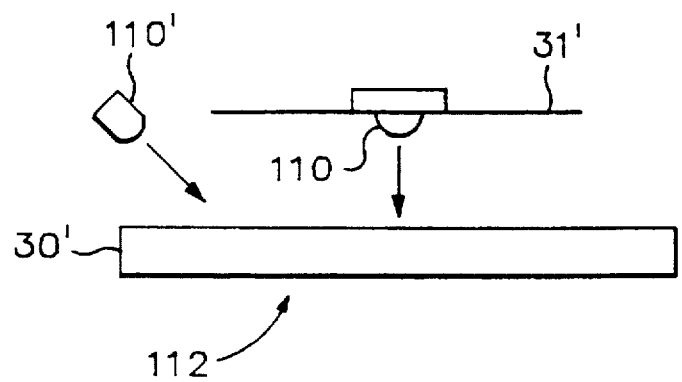

IMMINENT ICING CONDITION ENUNCIATOR

This is a continuation-in-part of U.S. patent application Ser. No. 08/408,694, filed Mar. 21, 1995, now abandoned.

This invention pertains to sensing of temperature and more particularly to sensing of temperature or icing conditions of a surface and providing an indication of imminent icing conditions.

BACKGROUND OF THE INVENTION

The detection of icing on a surface is desirable and of advantage in many applications. For example, detection of icing conditions on roadways would enable a driver to be informed that ice is present on the roadway so the driver could to accordingly adjust the style of driving or discontinue driving altogether before an accident occurs. In rail system applications, it is highly desirable to determine when icing occurs on the rails, so that the rail operator may take counter-active steps, for example at the beginning of a sanding operation wherein sand is drizzled onto the rails ahead of the locomotive (for example) to ensure that traction is maintained. Once traction is lost in a rail system as a result of icing, it is extremely difficult to regain traction.

Heretofore, various methods have been employed to attempt detection of icing. These methods have included placing temperature sensors near the road surface to provide ambient temperature reading. Often such detectors were combined with moisture detectors and a decision was made as to icing based on the presence of moisture and the ambient temperature. However, such methods are not always able to accurately predict icing since the ambient air temperature may be greatly different than the temperature of the road surface wherein the road surface may actually be in an iced state while the air temperature is somewhat above freezing. Inaccurate determinations can lead to an operator ignoring an icing detector's warning if the operator knows that the indicator does not provide an accurate warning at all times.

Other methods have employed a radiation source directed towards the roadway with a receiver in spaced relation to the transmitter so as to receive reflections from the road surface of the energy transmitted from the radiation source. Surface condition predictions were then made based on the absorption and reflection of the energy by the road surface. However, the use of a source and reflected energy reception complicates the installation of such a device and requires that both the source and the receiver be maintained in a clean state, free from dirt or other road debris which would obscure the emitter or receiver.

In aircraft applications, the ability to detect wing icing is of utmost importance, since ice formations on wings can degrade the aircraft's lift-to-drag ratio. Aircraft currently have a device to measure air temperature, called an OAT (outside air temperature) sensor. This instrument provides the pilot with temperature information all of the time, whether the aircraft is in the hanger, loading passengers, flying in clear air or penetrating an icing thunder head. Therefore, in cold weather, the OAT sensor could indicate freezing continuously whenever the temperature was below freezing. Such indications can be of limited usefulness since the OAT makes no environmental distinction and is therefore of limited assistance in detecting icing during night flights, for example, when pilots are unable to visually inspect wing surfaces for ice accumulation.

In applications where an optical/infrared type detector is employed in an external environment, the sensor elements are typically protected from the relatively harsh conditions. However, over time, dust, dirt, road spray, or the like result in the window, for example which protects the sensor from external elements, becoming contaminated or dirtied, and the dirt or other foreign material thereon will reduce the amount of infrared energy or the like transmitted through the window. Such contamination has required frequent cleaning of protective windows or the accuracy of the sensor would suffer.

The ability to detect icing conditions, particularly to detect imminent icing conditions, wherein an indication is provided that surface conditions of a roadway, for example, are close to the icing point is highly desirable and can greatly reduce the likelihood of accidents.

Use of cruise control devices in automobiles and trucks is becoming increasingly common. However, it can be dangerous to have a cruise control operating when driving on ice. Heretofore, it has been necessary that a vehicle operator recognize the icing condition and remember to manually disengage the cruise control to increase driving safety.

It is further desirable to be able to detect roadway or rail surface temperatures when such temperatures are exceedingly high, in order to allow an operator, of for example a truck, to adjust tire pressure or to cease operation altogether until the road surface temperature falls to a more desired level. In a rail application, the determination that the rails have become excessively hot can be a prime safety determination. In continuously welded rail systems, excessively hot weather can lead to warping of the rails due to thermal expansion, which increases the likelihood of derailment. If an operator is able to accurately determine the rail temperature, it would be possible to reduce the speed of the locomotive or to otherwise take precautions to avoid derailment.

SUMMARY OF THE INVENTION

The invention accordingly provides an icing detector for determining icing conditions of a surface, wherein an infrared sensor is positioned in spaced relation to the surface for detecting ambient infrared emissions from the surface and processing circuitry is provided for receiving the detected ambient infrared emissions and for determining the likelihood of icing conditions of a surface based on the received infrared radiation.

The device also may include filtering members for ensuring that only selected wavelength energy reaches the sensor and for blocking the passage of other wavelengths, to reduce the likelihood of sensor overload. A focusing system is also provided to enable the infrared energy from a precise surface position to be focused onto the sensor, thereby ensuring that the ambient radiation from a particular surface is detected and to further reduce the likelihood of background infrared radiation affecting the sensor.

In an alternate embodiment of the present invention, a detector provides general temperature indication of a surface without requiring direct contact with the surface, by employing infrared radiation detection. Accordingly, it is possible to detect overheated travel surfaces or the like.

It is accordingly an object of the present invention to provide an improved icing detector for determining the likelihood of icing on a surface.

It is another object of the present invention to provide an improved roadway icing condition detector suitable for use with a vehicle.

It is still a further object of the present invention to provide an improved system for warning drivers of the likelihood of icing conditions on the roadway surface.

It is yet another object of the present invention to provide an improved imminent icing sensor which is of relatively low cost.

It is still a further object of the present invention to provide an improved apparatus for detecting surface temperature of a roadway or the like while providing improved rejection of stray radiation.

It is another object of the present invention to provide an improved temperature detection apparatus which compensates for contamination on a viewing window thereof as a result of road spray, road dust or the like.

It is a further object of the present invention to provide an improved sensing device for detecting surface temperatures at a distance therefrom wherein a device is able to compensate for increasing contamination of a viewing window thereof over time, without requiring excessively frequent cleanings of the viewing window.

It is yet another object of the present invention to provide an improved imminent icing detector which will automatically disconnect a vehicle cruise control upon detection of icing conditions.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 1 is a block diagram of an imminent icing system according to the present invention;

FIG. 5 is a cutaway view of a passenger car mirror enclosure with a sensor according to the present invention installed therein;

FIG. 6 is a more detailed partial cross sectional view of the mirror enclosure of FIG. 5 illustrating the mounting of the sensor within the mirror enclosure;

FIG. 7 is a view of a particular embodiment of an indicator for providing imminent icing enunciation to a vehicle operator;

FIG. 8 is a block diagram of the processing circuitry of FIG. 1 which interprets the input from the sensor;

FIG. 14 is a cross sectional view of a shield member employed to limit the amount of stray radiation which reaches the sensor;

FIG. 15 is a schematic view of an active window contamination detection system in accordance with the present invention;

DETAILED DESCRIPTION

Figure 3:
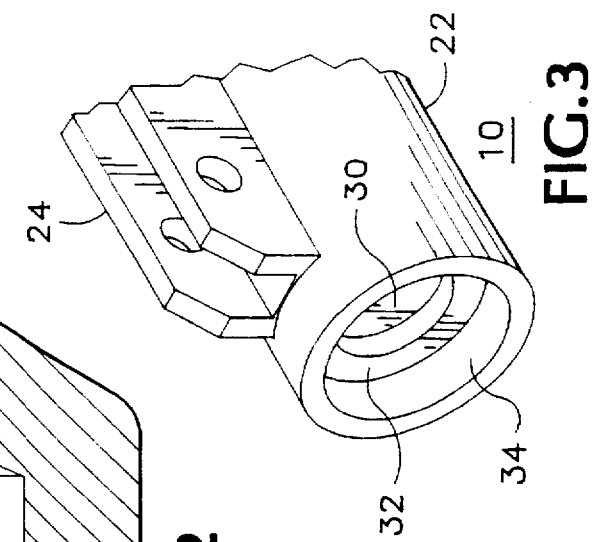
FIG. 3 is a perspective view of the sensor body of FIG. 2.

Infrared (I.R.) energy, which is radiation in a region of the electromagnetic spectrum having a wavelength between 0.5 and 20 micrometers, also referred to as the near-infrared and intermediate-infrared regions, is emitted by all objects having a temperature greater than absolute zero (−273° C.). The infrared energy radiated by an object at a given temperature is characterized by the term emissivity, which is the ratio of energy radiated by the given object to the energy emitted by a perfect radiator. Materials typically used for roadway surfaces, asphalt and concrete, have emissivity values of close to 1 (e.g., 0.9) which enables application of the present invention to sense the surface temperature of roadway surfaces, for example, based on radiated energy. Accordingly, referring to FIG. 1, a block diagram of an imminent icing system 10 according to the present invention, the system comprises an infrared sensor head 12 which is connected to processing circuitry 14. Processing circuitry 14 provides output to display modules which may comprise, for example, a liquid crystal display 16 or light emitting diode 18 or other suitable indicator. An on/off switch 20 controls operation of the apparatus. Operational power for the system is obtained from power supply 21. The sensor head 12 may also suitably comprise an active contamination emitter 13 which receives stimulus from processing circuitry 14 to assist in detecting contamination of the sensor head in a particular embodiment as discussed herein with reference to FIG. 15.

Figure 2:
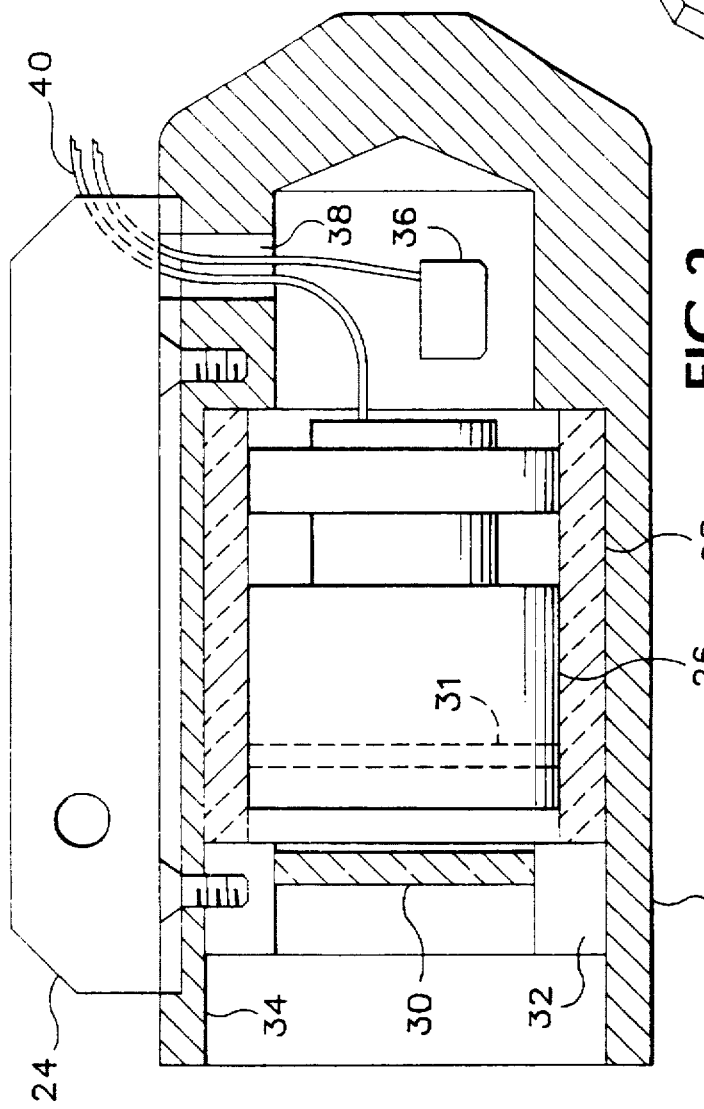
FIG. 2 is a sectional view of a particular embodiment of a sensor head according to the present invention, adapted for mounting to an external member of a vehicle.

Referring now to FIG. 2, a cross sectional view of a particular embodiment of the sensor head 12 of FIG. 1, it may be observed that the sensor comprises an enclosure 22 which has a mounting flange 24 attached thereto to enable mounting at a particular use site. Positioned within the body of enclosure 22 is an infrared optic head assembly 26 which is held in place by thermal/mechanical isolation member 28, which provides a secure engagement between the infrared sensor and the body 22 while also providing thermal and mechanical isolation between the sensor and the body. The body 22 is open at one end thereof and sensor 26 is oriented such that infrared radiation is received to the sensor via the opening in the body. Positioned between the opening and the sensor is a window 30 which assists in preventing contamination of the sensor 26 and also, in the illustrated embodiment, provides a bandpass filtering function to limit the energy reaching the sensor to a desired band. In the illustrated embodiment, the window comprises a zinc selinide or zinc sulfide window which has a pass band of approximately 5–20 micrometers wavelength. The window 30 is held in position via bezel 32 which is annular in configuration so as to fit within the opening 34 in mounting enclosure 22. It will be understood that while in the illustrated embodiment the enclosure is substantially cylindrical in shape, other shapes may be envisioned with attendant changes in the shape and configuration of the bezel, window and the thermal/mechanical isolation member. Also, enclosed within body 22 is a temperature sensor 36 which detects the ambient temperature of the air and infrared sensor so as to provide temperature compensation which is used to enable accurate readings from the infrared sensor without interference as a result of the ambient temperature of the sensor itself. A wiring hole 38 is provided in the body 22 to enable sensor wires 40 to pass from the infrared sensor 26 and/or temperature sensor 36 to processing circuitry 14 (FIG. 1).

The infrared sensor 26 also suitably includes a focusing member 31 therewithin, illustrated in phantom in FIG. 2. The focusing member suitably comprises a refractive lens, for example, a plano-convex lens, which allows focusing of the infrared radiation so as to provide sensing of radiation from a surface at a specific distance from the sensor. The focusing element may alternatively be a reflective type focusing system with attendant changes in the orientation of the sensor 26 wherein a convex mirror reflects the energy back to the sensor portion. The focusing element for some applications may be deleted allowing for an unaltered energy field input to the sensor. A field stop which restricts the field of view or an aperatured sensor may also be employed for controlling the field of view of the sensor element.

Referring to FIG. 3, which is perspective view of a portion of the apparatus 10 according to the present invention, it may be observed that in the illustrated embodiment, the sensor body 22 is substantially cylindrical in shape with a circular opening 34. Annular bezel 32 and window 30 are also visible. The mounting bracket 24 as illustrated in FIG. 3 is channel shaped and includes apertures therein for receiving mounting hardware to enable mounting to a vehicle or the like.

The infrared sensor 26 can comprise, for example, an OS51 I/R optic head assembly distributed by Omega, or the like, while the window 30 comprises a zinc selinide window available from IR Products Company. Other infrared compatible material may be substituted for the zinc selinide window. The particular infrared sensor portion comprises a thermopile core or other pyroelectric type infrared sensor. The sensor body 22 is suitably of machined aluminum, as is mounting bracket 24 and bezel member 32. The thermal/ mechanical isolation is optional and may comprise, for example, a foam sleeve.

In use, the sensor body 22 is mounted to an external portion of the vehicle, for use in applications for determining roadway icing conditions. As an example, the sensor body may be mounted to a support member of an external mirror which is attached to, for example, the cab of a truck. The sensor is mounted with opening 34 oriented in a downwardly direction, so as to provide an unobstructed view of the roadway surface for the infrared sensor 26. The use of the focusing element and proper placement of the sensing body at a specified height above the road surface enables infrared energy emitted by the surface portion of the roadway to be detected, while minimizing detection of stray infrared radiation from other objects or surfaces.

Figure 4:
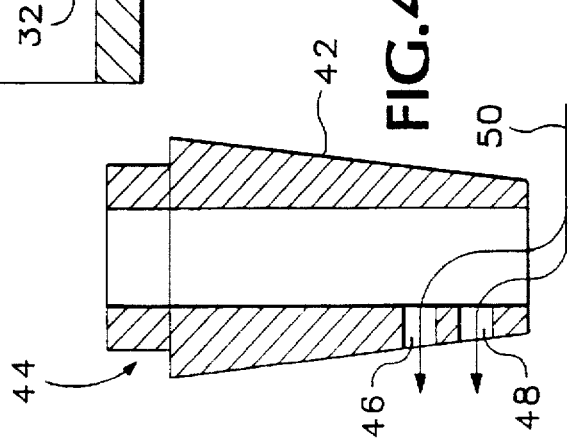
FIG. 4 is a sectional view of a protective device adapted to mount to the sensor head of FIG. 2, for assisting in maintaining the viewing window in a clean condition.

Referring now to FIG. 4, a cross sectional view is shown of a protective device which is adapted to mount to the sensor head body. The protective device comprises a frustoconical shaped member 42 with an aperture extending the length thereof and which is open at both ends so as to provide a viewing port therethrough. The member 42 is cut in stepwise fashion at a base end thereof so as to provide a mating portion 44 which fits in securely engaging fashion within the annular opening 34 of sensor body 22. Two apertures 46 and 48 are provided crossways through the face of the frusto-conical member so as to intersect the central bore of the member substantially perpendicularly thereto. When installed, the protective member channels airflow across the distal end thereof through the two openings 46 and 48, so as to cause airflow which occurs as a result of movement of the vehicle to which the sensor is mounted, to pass along line 50 and through openings 46 and 48. This flow provides an air curtain effect which substantially reduces the likelihood of debris from passing the entire length of the central bore of member 42 and striking and possibly obscuring window 30. Thus, window 30 is maintained relatively unobscured by dirt or other debris. It will be understood that member 42 is optional as dictated by the particular operating conditions.

FIG. 5 is a cutaway view of a mirror enclosure housing of a typical passenger car 51 (shown generally in FIG. 5), illustrating an alternative placement of the icing sensor of the present invention, when used in conjunction with passenger vehicles, for example. The mirror housing 52 is typically aerodynamically shaped and supports mirror 54 at the trailing edge thereof. Located within the interior of the mirror enclosure is sensor 22', which is received within mount 56 at the bottom wall of the mirror enclosure. Wiring bundle 58 exits the sensor 22' and is passed out of the body of the mirror enclosure via aperture 60.

FIG. 6 illustrates in partial cross section further details of the structure of sensor 22' and mounting block 56 of FIG. 5. As may be observed in FIG. 6, the bottom wall of mirror housing 52 has an opening 62 formed therein centrally of the position of sensor 22', thereby affording a viewing aperture for the infrared sensor. Mounting member 56 is suitably secured to the wall of the mirror housing via adhesive 64, or other suitable means. The mounting member in the particular embodiment has an annular interior and is threaded so as to engage with corresponding threads on the outer surface of housing 66. The sensor is enclosed within housing 66. In a similar construction to the sensor of FIG. 2, sensor 22' includes an infrared detector assembly 70 which includes a focusing element and infrared thermopile mounted within sensor housing 66 via thermal and mechanical isolation sleeve 72 which suitably comprises a foam sleeve. A window 74 substantially seals the opening 62 to prevent moisture or debris from entering the interior of the mirror housing, while still enabling infrared radiation to pass to the sensor. Window 74 suitably comprises a zinc selinide window or other material suitable for passing IR radiation which also serves as a filter to provide a pass band of a given infrared radiation wavelength band. The window is suitably formed so as to provide a flush surface along the bottom of the mirror enclosure 52. This construction enables a laminar flow across the bottom surface of the mirror enclosure 52 which substantially reduces the contamination which builds up on window 74. The need for cleaning of the windows is thereby greatly reduced. If a non-laminar flow is present at the bottom of mirror enclosure 52, the likelihood is greater that dirt or road spray will collect on window 74, hastening the contamination rate of the window surface. A corresponding aerodynamic structure with laminar flow characteristics is employed in embodiments of the invention where the sensor is mounted other than in the body of a mirror enclosure, for example when the icing sensor is configured as a stand alone sensor member external of any mirror enclosure or the like. Mounted atop the sensor 70 is ambient temperature sensor 76 which serves to compensate for the ambient temperature so as to allow proper correlation of the infrared sensor output, since the sensor output varies with changes in ambient temperature. Cable 58 communicates the voltage generated by the infrared sensor and ambient temperature sensor for further processing as discussed hereinbelow. The embodiment of FIGS. 5 and 6 thus provides an icing indicator suitable for use in, for example, passenger vehicles wherein the sensor is essentially concealed, to provide sensing while not altering the appearance of the vehicle. Referring again to FIG. 5, the processing circuitry 14 in a preferred embodiment is contained within the enclosure 52 or otherwise nearby to sensor body 22' such that essential processing takes place adjacent the sensor, whereupon a digital signal output to the displays and inputs from the controls travel via wiring bundle 58 into the interior cab of the truck or other vehicle. Since the environment in which a motor vehicle operates can be particularly noisy in an electromagnetic sense, providing the essential processing of the analog signals from the IR sensor in close proximity to the point at which those signals are generated by the sensor result in less likelihood of noise, be it from the vehicle engine or other operating environment electromagnetic interference, from affecting the analog signal from the sensor or completely drowning out the signal. The digital output signal from the processing circuit 14 then provided to the display is much more robust, having a greater signal-to-noise ratio than the analog output of the IR sensor.

FIG. 7 illustrates a display enunciator suitable for use with the present invention. This enunciator would typically be mounted at the dashboard of a passenger vehicle when used, for example, with automotive applications. The information is provided in a relatively simple non-technical manner as may be desired by passenger car drivers who use the vehicle casually, rather than as a profession. The enunciator includes a display 78, which in the illustrated embodiment, employs a depiction of an automobile with swerving tracks, to indicate icing conditions. The display 78 is suitably lighted when it is determined that icing conditions are imminent, as discussed hereinbelow. The installation also includes a rocker-type switch 80 corresponding to on/off switch 20 of FIG. 1, which enables the device to be activated or deactivated by toggling of the switch to the left or to the right. The switch may suitably be backlighted to indicate when the system is active.

Referring now to FIG. 8, a block diagram of processing circuitry block 14 of FIG. 1, the arrangement and operation thereof will be described in greater detail. The processing circuit block comprises a microprocessor 82 which includes memory 84 for storing the operational instructions and data therefor. Memory 84 may comprise a RAM/ROM combination, EEROM, or the like. The microprocessor interfaces with display 86 which may comprise, for example, the particular display 78 of FIG. 7, or any suitable indicator. The display may also include a digital readout of air and road surface temperatures or other suitable message. Operator commands are supplied to the processor via controls 85, which may include on/off switch 20 (FIG. 1) or the like. Power for the various components is supplied by power conditioning block 87 which takes a DC voltage input ($DC_{in}$) from, for example, a battery. Data from IR sensor 22 is fed through a variable amplifier 93 (which receives amplification level control information from the microprocessor) to a plus (+) side of a summing circuit 89, while the minus (−) side of summing circuit 89 is connected to reference block 91 (REF). The output from summing circuit 89 and reference block 91 are supplied, via buffers 90 and 92 to analog-to-digital converter/multiplexer block 88 (A/D & MUX). Output from ambient temperature sensor 36 is also received by A/D & MUX 88. The microprocessor receives input data from A/D & MUX 88, as selected by microprocessor control of the select lines (SEL) of the multiplexer. Microprocessor 82 also provides an additional output to a cruise control decouple circuit 95 which may comprise a relay, for example, and the output thereof is supplied to the cruise control operational circuitry of the vehicle. Active contamination sensing emitter 13 receives input from the microprocessor 82 and under program control, provides sensing of contamination on the window of the infrared sensor as discussed hereinbelow with reference to FIG. 15.

In operation, sensor 22 generates a voltage output based on the amount of infrared radiation detected and, as altered by amplifier 93, summing block 89 and buffer 90, is converted to digital values by A-to-D converter 88. Similarly, the ambient air temperature sensor 36 and the voltage output thereof which is representative of air temperature is also supplied to A-to-D converter 88 for conversion-to-digital values. Block 88 supplies a multiplexed output so as to provide the digitized infrared sensed data from block 22 and the digitized ambient air sensed data from block 36 in alternate fashion to microprocessor 82. The reference block 91 in conjunction with summing block 89 enables a precision measurement of the output of sensor 22.

Amplifier 93 is controlled by microprocessor 82 to vary the level of amplification of the signal coming from infrared sensor 22. The apparatus is thus able to compensate for contamination on the window of the sensor, for example by noticing, under software control of the microprocessor, that the signal levels from the sensor are beginning to drop off gradually. The amplifier 93 is thus commanded to increase its gain, to thereby provide a generally constant input signal from the infrared sensor. In accordance with this process and the amplifier component, the device is able to compensate for dirtying of the window on sensor 22, to continue relatively stable measurement up through a certain degree of contamination. The preferred embodiment of the present invention also employs the cruise decoupling circuit 95, which as noted hereinabove may comprise a relay, for example, which operates under control of microprocessor 82 to shut off or otherwise disconnect the vehicle's cruise control upon detection of icing. Since the use of cruise control is strongly advised against in icy conditions, professional drivers especially may desire that upon detection of icing, that the vehicle's cruise control system be decoupled to ensure that cruise control is not operative while driving on ice. The microprocessor, upon detection of icing will, if the cruise decouple option is enabled, direct cruise decouple 95 to disconnect cruise control. This may essentially consist of opening a relay, for example. Other operations may be appropriate, depending on the particular operational characteristics of the cruise control circuitry. The display module discussed hereinbelow with reference to FIG. 16 may employ connectors on the back side thereof to allow connection to the cruise control circuitry of the vehicle, while an enabling control switch may suitably be provided somewhere on the vehicle's control panel to either engage or disengage the cruise decouple option.

In operation, the stored program and data in memory 84 includes operational software for the microprocessor so as to periodically sample the data from multiplexer 88 and to provide an indication of whether icing is imminent or not based on the input infrared sensor data and ambient air sensor data. This may be accomplished, for example, via use of look-up tables which hold empirically determined values correlating the sensed voltage values from infrared sensor 22 and air sensor 36 with actual surface temperatures. In a preferred embodiment, as discussed hereinbelow, the sampled data is provided as input to an equation for determining temperature based on the sensor inputs. If the sensed temperature is below a threshold value, for example 35° F., then an indication is provided to display 86 to illuminate, for example, the car icon 78 of FIG. 7. Also, an actual temperature value may also be displayed via an alphanumeric display, for example.

Figure 18:
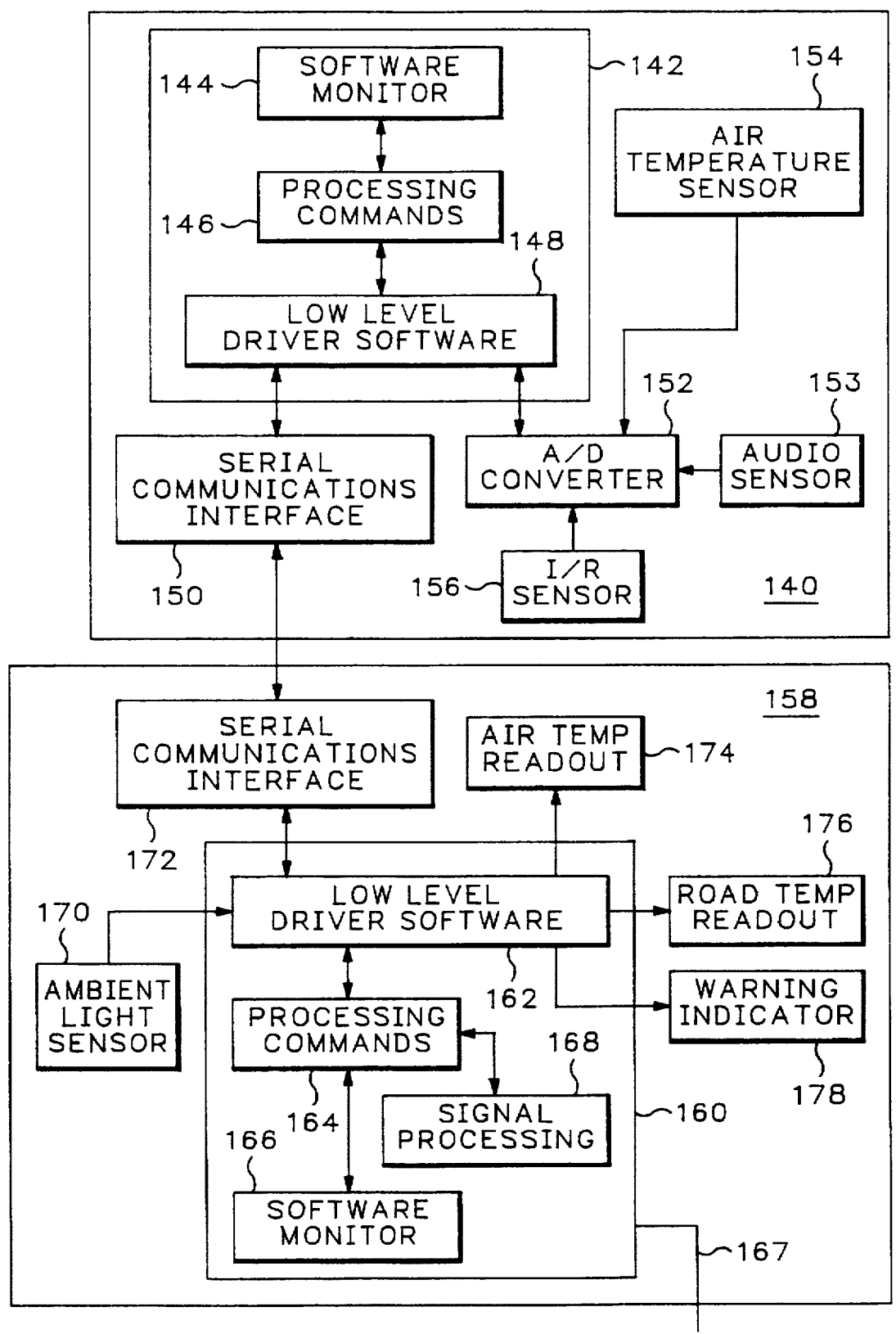
FIG. 18 is a block diagram of a preferred embodiment according to the present invention wherein the display and sensor head each comprise a "stand alone" unit, each with its own microcontroller for driving the operation thereof.

FIG. 18 is a block diagram of a preferred embodiment of an icing sensor and display according to the present invention wherein the display 158 and sensor head 140 comprise "stand alone" units, each with its own microcontroller for driving the operation thereof. The sensor head block 140 includes a microprocessor or microcontroller 142 which is programmed to run a software monitor 144, which interfaces with a command processing module 146 and low level driver software 148. The low level driver interacts with a serial interface 150 and an A-to-D converter 152. Air temperature sensor 154, IR sensor 156 and audio sensor 153 provide input to the A-to-D converter and the output thereof suitably is retrieved by the driver software running on microcontroller 142. The serial interface provides two-way communication with external devices so that the temperature, IR and audio sensor output may be polled and suitably provided as desired. In the embodiment of FIG. 18, the display module 158 includes microprocessor or microcontroller 160 which employs low level driving software 162, command processing software 164 and software monitor 166 (which functions in a corresponding manner to the monitor, processing and driver software of block 140). The display block further includes an ergonomic signal processing software block 168 which employs smoothing and other such operations to enable a meaningful display to be provided to a user, even if the data provided by the sensor is changing rapidly. Display module 158 further includes an ambient light sensor 170 which is interfaced to the low level software driver, zero communications interface 172, air temperature readout display 174, road temperature readout 176 and warning indicator 178. Interface 172, readouts 174 and 176 and indicator 178 all interface with the low level driver software routine 162. An external device control line 167 is further provided from display module 158, to enable activation or control of a peripheral device (e.g. the cruise control of a vehicle) based on the icing determination or measurements taken by the sensors (other suitable devices can also be driven). The embodiment of FIG. 18 enables use of relatively low cost microcontroller modules with limited memory and functionality, rather than requiring use of a more expensive microprocessor or microcontroller.

In a preferred embodiment, the sensor head 140 is a stand alone unit which collects the infrared energy from the road surface, measures the air temperature, converts the infrared energy measurement to road surface temperature, and provides the road surface temperature, air temperature and status.

Since the sensor head is suitably a complete independent measuring unit, it can be connected to any device with an RS-232 serial port that can send a query and accept the response. This requires only a small additional interface inside the vehicle to connect it to any system using serial communications. Thus, the air and road surface temperature can be monitored by other vehicle systems if required. In the standard configuration, the sensor head plugs directly into the display module 158. The display module fits a standard two inch round cutout in the dash of a vehicle.

The display module suitably provides power to and handles communications with the sensor head, measures the ambient light level in the vehicle cab, stabilizes the temperature display, warns the driver to be alert for possible icy conditions, digitally displays the road surface temperature and air temperature, and provides an indication when the sensor head window needs to be cleaned. The display can be selected to show either degrees C. or degrees F.

Under certain conditions, a moving vehicle will observe rapid changes in road surface temperatures referred to as the "picket-fence effect". The first major objective of signal processing software employed by the invention involves dealing with the "picket fence" effect. Under high solar energy fluctuation conditions, digital display of the inferred road surface temperatures will vary in a manner that is visually annoying at the least and uninterpretable at the worst. Higher vehicle speeds aggravate this phenomena since patches of pavement at different temperatures will be passing under the IR sensor at a faster rate. Therefore, the digital display is stabilized in a manner that enhances the driver's ability to assimilate the information but which still reflects the lowest pavement temperatures rather than the average pavement temperature. Furthermore, as the icing sensor typically includes no independent means for inferring the vehicle speed, the signal processing is speed insensitive to a certain degree. Since the frequency of the signal induced in the IR sensor by fluctuations in road surface temperature increases with speed, the signal processing software compensates for this phenomenon.

A second major objective centers on providing the driver with an easily recognized alert that the measurable parameters discussed above suggest icing may be imminent. This alert takes the form of a lighted indicator 178 which is off when icing is not suggested, blinking when the measured quantities suggest that the road surface may hold a potentially hazardous mixture of ice and water if sufficient moisture is present, and on constantly when temperatures are low enough to suggest that hard-frozen ice will be present if sufficient moisture is available. An audible alert that sounds for a short time when conditions first transition into the freezing range may also be provided.

A third major objective of the invention focuses on providing the driver with an indication that road grime has accumulated on the IR sensor, which could lead to degrading of the accuracy of the IR energy measurement. As oils, dirt and moisture accumulate on the sensor window, the road surface temperature inferred from the IR sensor output converges to the air temperature reading since the contaminating material is at or near the air temperature. Unfortunately, an analogous situation holds when the pavement temperature and air temperature converge due to the lack of solar radiation (such as at night). Thus, the signal processing software must assess the air and pavement temperatures and the ambient light levels in some fashion to provide the driver with an indication that the sensor lens may be dirty.

The software suitably operates in real-time on a low-cost, low-speed 8-bit microcontroller to meet product cost goals, environmental constraints and size constraints necessary for commercial viability. This requirement significantly limits the computational power available for conventional signal processing to convert the raw sensor inputs to various estimated parameters and fuzzy logic processing to infer from those parameters whether icing may be imminent. This necessitates careful algorithmic design to restrict the precision of the conventional signal processing steps as much as possible and to limit the number of fuzzy inferences that must be executed to produce a final decision.

The digital signal processing (DSP) functions in the sensor according to the present invention serve two main functions. The sensor head DSP converts the digitized output of the thermopile IR sensor and solid-state air temperature sensor to air and road surface temperature estimates. The display module DSP includes a set of single-pole low-pass filters used to approximate the running average of the various parameters used as inputs to the fuzzy inference processing described later and processing to stabilize the air and pavement temperature display.

In the sensor head, the air temperature and IR sensor outputs are continuously sampled at a relatively high rate (compared to the remainder of the signal processing) and approximately averaged using a conventional single-pole low-pass filter:

$$y(n)=(1-q)y(n-1)+qx(n) \quad (1)$$

where x(n) represents the input. y(n) represents the output and $0<=q<1$. The parameter q is selected according to standard sampling theory to minimize aliasing effects in the subsequent DSP that operates at a sampling rate of about one and a half orders of magnitude slower than the input sampling rate. Although the sensor uses an 8-bit processor, to achieve the necessary accuracy this processing is carried out in 32-bit precision (16-bit operands, 32-bit products).

The air temperature transducer outputs a voltage that is linear with temperature. Thus the estimated air temperature a(n) in degrees F. is related to the transducer output t(n) by a linear equation:

$$a(n)=At(n)+B \quad (2)$$

Although the transducer as supplied is calibrated by the manufacturer, the parameters A and B are suitably computed during manufacturing test to improve overall system accuracy.

In contrast to the air temperature transducer, the IR transducer outputs a voltage i(n) that is proportional to the difference between the fourth power of the radiating surface temperature p(n) in degrees F. and the air temperature a(n) in degrees F.:

$$p(n)=\{Ci(n)+[a(n)+2297/5]^4\}^{(1/4)}-2297/5 \quad (3)$$

As with the air temperature sensor, the parameter C is suitably computed by a calibration test during manufacturing. Ordinarily, for this equation to be accurate, the parameter C would have to vary depending on the IR emissivity of the road surface. However, since most road surfaces have emissivities between 0.93 and 0.96, a single value for C suffices.

At each sampling instant, both an air temperature and road temperature estimate are computed. The resulting estimates are then transmitted for display and further processing.

As noted hereinabove, the display module signal processing software includes a set of single-pole low-pass filters (1) used as average estimators for several parameters needed by the fuzzy inference processing. These estimators are designed to improve the performance of the fuzzy inferencing for a range of vehicle speeds and to minimize the computational burden they impose. Finally, the display module software also includes computations to stabilize the air and road temperature display.

To understand the effect of vehicle speed and the mechanisms employed in the sensor to compensate for these effects, consider the idealized case where cool and warm patches of road surface are interspersed with a uniform distance d between subsequent cool (or warm) patches. If the vehicle travels at speed v, the induced signal has a repetition period v/d. Thus, a vehicle moving at 90 km/h induces a higher frequency signal than a vehicle moving at 50 km/h. Now the parameters passed to the fuzzy inferencing are in effect weighted averages over a finite time interval. Translated to the road surface, these estimates represent weighted averages over a patch of pavement whose size varies with speed. This effect due to speed could be easily compensated for in the apparatus according to the present invention if some measure of vehicle speed were available. Failing that, a bank of low-pass filters with increasing cutoff frequencies could be employed to present a set of estimates for different length pavement sections. post-processing techniques then could be used to select the highly active filter outputs and thereby achieve somewhat speed invariant estimates. However, to minimize the required processing power, a pair of average estimating filters are employed, one for each speed sensitive parameter, under the premise that vehicles predominately travel at highway speeds of about 90 km/h and city speeds of about 50 km/h.

In the display unit, single-pole low-pass filters (1) are used to estimate a parameters table. In the table, parameters $_{13}$slow and $_{13}$fast are those relevant for slow and fast vehicle speeds respectively. Furthermore, the variance estimates, which for an abstract signal x(n) should be of the form:

$$\text{variance } x(n)=\text{average } |x(n)-\text{average } x(n)|^2$$

are approximated using the absolute value:

$$\text{absvariance } x(n)=\text{average } |x(n)-\text{average } x(n)| \quad (4)$$

to reduce the processing burden. Finally, the so-called rate of change parameters are simply estimates of the average of the difference signal:

$$dx(n)=x(n)-x(n-1) \quad (5)$$

Although the inputs to each of the average estimators by the listed quantities are computed initially using 16-bit math, due to the imprecise quality of the subsequent fuzzy inference processing, all of the computed quantities in Table 1 need not maintain full precision. Therefore, to save processing cycles, all parameters except the average temperatures $pm_{13}slow(n)$, $pm_{13}fast(n)$, $am_{13}slow(n)$, and $am_{13}fast(n)$ are first coarsely quantized before being input to the estimators. The single-pole, low-pass filter estimator computation (1) is carried out using 8-bit math. For a particular parameter, $ad_{13}slow(n)$, where $$ad_{13}slow(n)=(1-q)\ ad_{13}slow(n-1)+q\ ad_{13}q(n) \quad (6)$$

the coarseness of the quantization operator Q(n) applied to the input:

$$ad_{13}q(n)=Q(ad(n))=Q(|a(n)-a(n-1)|) \quad (7)$$

depends in the following manner on the parameter q in (1): Let k be
the smallest number such that $$q>=2^{(-k)} \quad (8)$$

(it is assumed that $0<k<=6$). Then the number of bits b available for representing the quantized version of $ad_{13}q(n)$ such that the estimator (6) can be implemented using 8-bit math is:

$$b=7-k$$

since the most significant bit in the 8-bit quantity $ad_{13}slow$ must be reserved as a sign bit.

TABLE 1

| ESTIMATED FUZZY INFERENCING INPUTS |
| --- |
| i) road surface temperature p(n) related:<br>   a) average road surface temperatures: pm_slow(n), pm_fast(n) |

TABLE 1-continued

ESTIMATED FUZZY INFERENCING INPUTS b)  average road surface temperature variance
        (4): pv_slow(n), pv_fast(n)
ii)  air temperature a(n) related:
    a)  average air temperatures: am_slow(n),
        am_fast(n)
    c)  average air temperature rate of
        change (5): ad_slow(n) ad_fast(n)
iii)  ambient light l(n) related (derived from the
    ambient light sensor in the display unit):
    a)  average light level: lm(n)
    b)  average light level variance (4): lv(n)
iv)  difference between air and road surface
    temperature (d(n) = a(n) − p(n)):
    a)  average difference: dm(n)
    b)  average difference variance: dv(n)

Due to the "picket-fence effect", direct digital display of the inferred road surface temperature p(n) will vary in a manner which is visually annoying at the least and uninterpretable at the worst. To a much lesser extent this phenomenon can also be experienced with digital display of the air temperature. To deal with the latter case, the air temperature $a_{13}dsp(n)$ displayed by the device is the shorter time average air temperature $am_{13}fast(n)$ rather than the direct air temperature a(n).

In contrast to the case of air temperature, the device employs a more sophisticated approach to stabilizing the road surface temperature display. The driver actually is interested in the lowest temperature over a stretch of road surface consisting of warm and cold patches rather than the average, since this low temperature is a more suggestive indicator of potential icing. The memory and computational constraints of the 8-bit microcontrollers as employed in a particular embodiment of the invention preclude the approach of storing a set of consecutive readings and searching for low temperature peaks. Rather, the current pavement temperature p(n) is continuously compared to a threshold parameter pt(n), derived as the output of a low-pass filter (1) driven by the shorter time average pavement temperature $pm_{13}fast(n)$, as follows:

$$pt(n)=(1-r)\,pt(n-1)+r\,pm_{13}fast(n) \qquad (9)$$

where the parameter r is greater than the corresponding parameter in the $pm_{13}fast(n)$ estimator. If the current road surface temperature p(n) is less than the threshold pt(n), the current temperature p(n) is the displayed temperature $p_{13}dsp$ (n) and the threshold pt(n) is reset to p(n). On the other hand, if the threshold is less than the current temperature, the previously displayed $p_{13}dsp(n-1)$ is held as the current temperature $p_{13}dsp(n)$.

In the preferred embodiment, fuzzy logic is employed with rules embodied in memory 84 and interpreted by microprocessor 82 so as to provide a sophisticated analysis of road surface temperature versus air temperature. For example, if the air temperature has been steadily cold but the road surface is warm, the likelihood is that the road is warm due to radiant heating (e.g., from sunlight). In such a situation, shaded portions of the road are likely to be icy, so a warning is appropriate. Fuzzy logic refers to a superset of conventional logic, with modifications to include the concept of partial truths, wherein truth values may be on a continuum between entirely true and entirely false.

Figure 9:
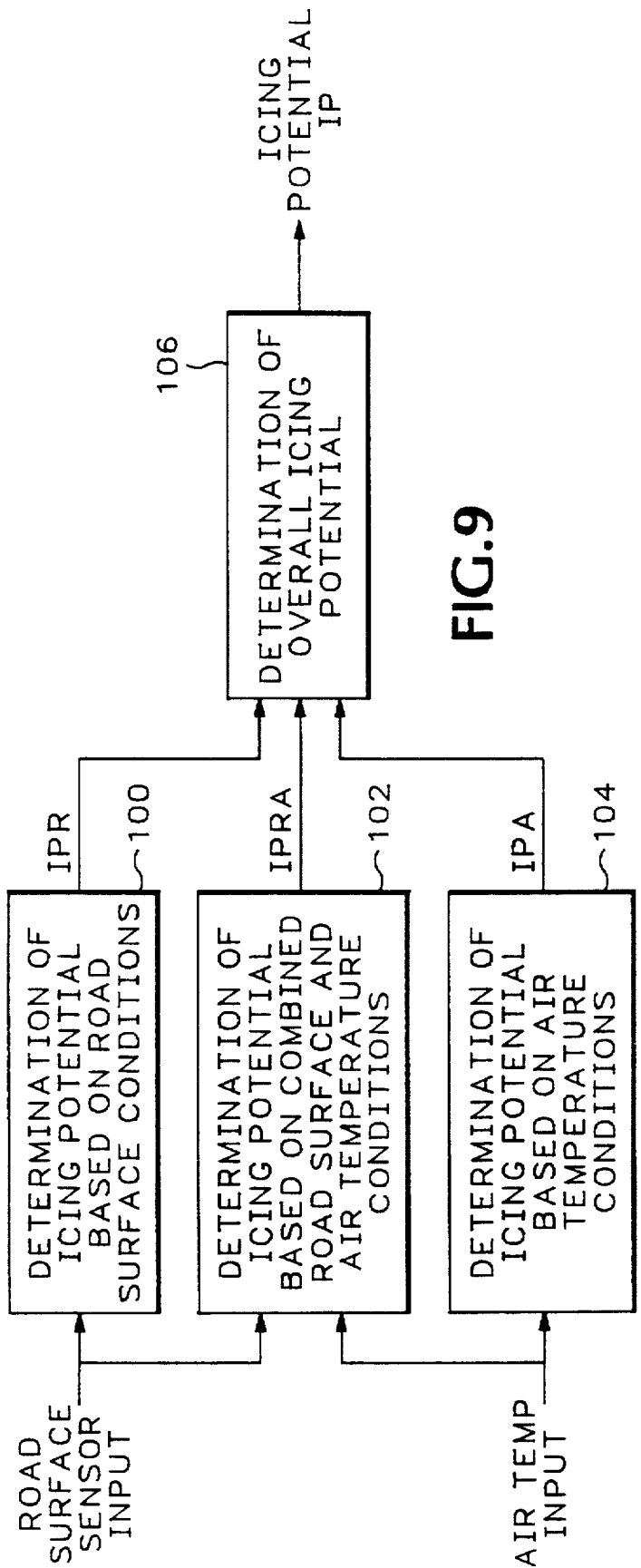
FIG. 9 is a structure diagram of the decision levels employed in a particular embodiment of the invention.

Referring now to FIG. 9, which is a structure diagram of the decision making levels employed in one embodiment of the invention employing fuzzy logic, the road surface sensor input and the temperature input are employed in three separate decision making blocks, wherein in block 100 a determination is made of icing potential based on the road surface condition as sensed by the road surface sensor input; in block 102, a determination is made of a icing potential based on a combination of the road surface input and the air temperature sensor input; and in block 104 a separate determination is made of icing potential based on the air temperature conditions alone as sensed by the temperature sensor 76 of FIG. 6, for example. The three determinations of each of blocks 100, 102 and 104 are then provided to a separate, fourth determination block 106 which makes a prediction of overall icing condition based on the three separate icing potential decisions. This overall decision, of icing potential is then provided to display 86 (FIG. 8). The display may be provided in multiple versions, wherein one display is a bi-state display of either on or off, indicating icing not likely or icing likely; an alphanumeric display wherein icing likelihood is classified as none, low, moderate or high; or the like. The decision may also be displayed in conjunction with temperature indications which provide a road surface temperature as well as an ambient air temperature based on the sensor inputs.

Figure 10:
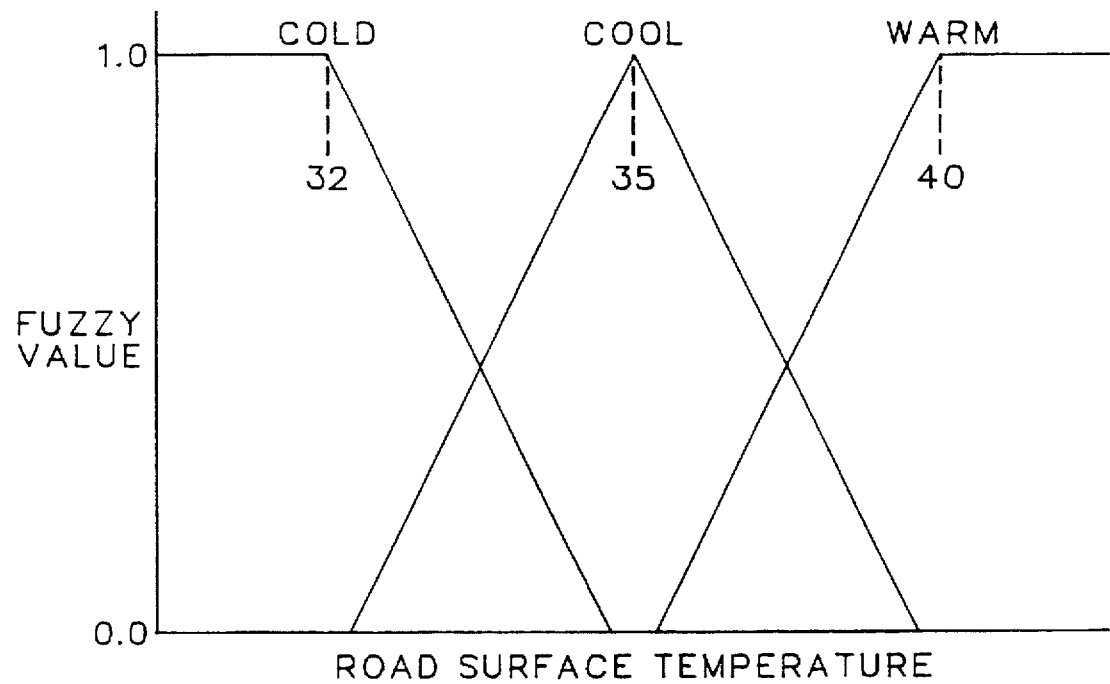
FIGS. 10–13 are graphs showing input consideration factors in determining icing potential.
Figure 11:
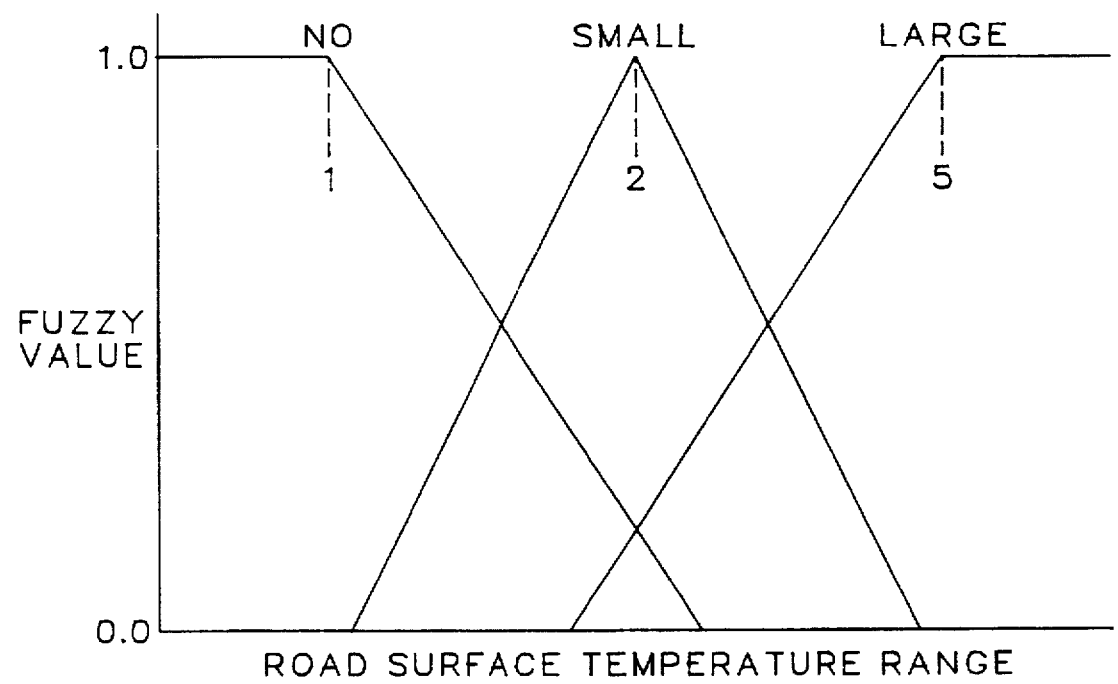

The following fuzzy logic rules system is used to process the data and produce the output decision of ice danger. The basic raw inputs are:

1.  Road surface temperature
    a.  Warm road (WARM) greater than 40 deg F.
    b.  Cool road (COOL) centered at 35 deg F.
    c.  Cold road (COLD) less than 32 deg F.
2.  Road surface temperature range
    a.  Large changes (LARGE) greater than 5 deg F.
    b.  Small changes (SMALL) centered at 2 deg F.
    c.  No change (NO) less than 1 deg F.
3.  Air temperature
    a.  Warm air (WARM) greater than 40 deg F.
    b.  Cool air (COOL) centered at 35 deg F.
    c.  Cold air (COLD) less than 32 deg F.
4.  Air temperature rate of change
    a.  Rapid increase (RAPID INCREASE) increasing at
        greater than .25 deg F./min
    b.  Stable (STABLE) centered at
        no change
    c.  Rapid decrease (RAPID DECREASE) decreasing at
        greater than .25 deg F./min FIGS. 10 and 11 are graphs illustrating the fuzzy logic consideration based on the road surface temperature and road surface temperature range. For example, a road surface temperature of 32° or less has a cold value of 1.0 and cool and warm values of 0 (entirely false). As temperature increases, the value of cold decreases while "cool" increases towards 1.0 (entirely true), for example.

Figure 12:
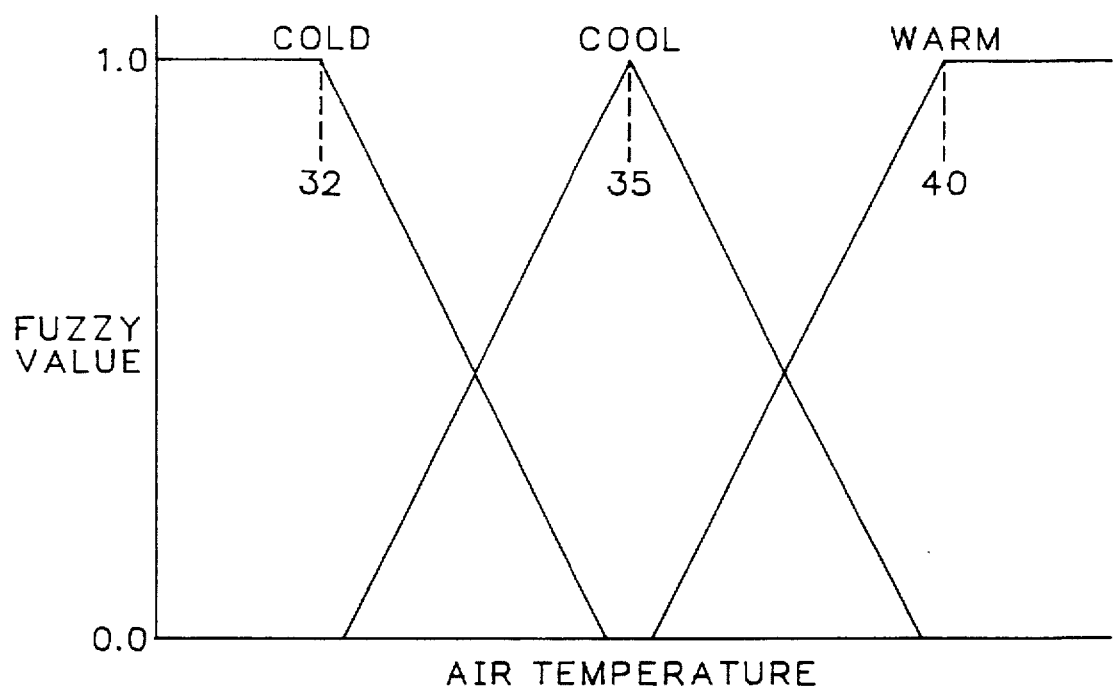
Figure 13:
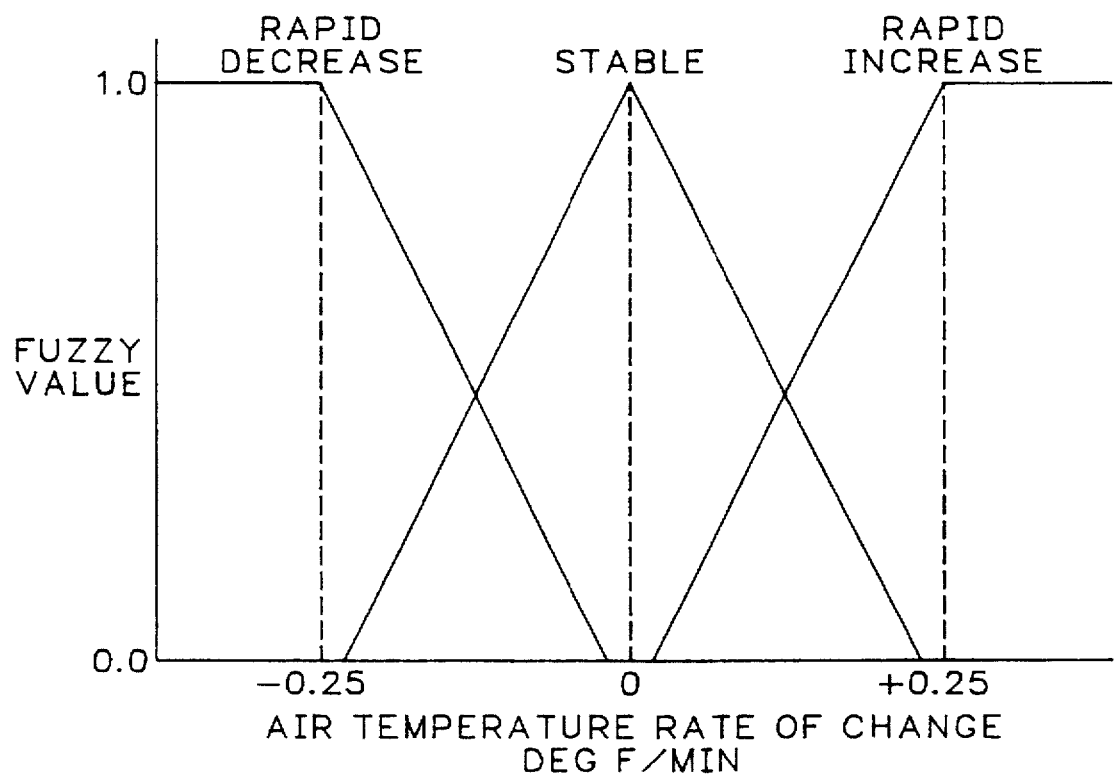

FIGS. 12 and 13 show the corresponding truth values (or fuzzy values) for the air temperature and air temperature rate of change factors.

Rules for determining icing potential due to road temperature as implemented by decision block 100 are as follows:

An output ice potential due to road (IPR) is generated by block 100 and has a value of

1. STRONG

2. MODERATE

3. NONE

The rules for icing potential due to road temperature are as follows:

TABLE 2

Icing potential due to road temperature
(IPR)

If pm_slow is WARM or pm_fast is WARM then
   IPR is NONE.
If pm_slow is COOL and pv_slow is LARGE or
   if pm_fast is COOL and pv_fast is LARGE then
   IPR is STRONG.
If pm_slow is COOL and pv_slow is MEDIUM or
   if pm_fast is COOL and pv_fast is MEDIUM then
   IPR is MODERATE.
If pm_slow is COOL and pv_slow is SMALL or
   if pm_fast is COOL and pv_fast is SMALL then
   IPR is NONE.
If pm_slow is COLD or pm_fast is COLD then
   IPR is STRONG.

The rules for determining icing potential due to air temperature as implemented by decision block 104 are as follows:

An output icing potential due to air (IPA) can be one of three values

1. STRONG
2. MODERATE
3. NONE

The specific rules for icing potential due to air (IPA) are as follows:

TABLE 3

Icing potential due to air temperature

If am_slow is WARM and ad_slow is INCREASING or
   if am_fast is WARM and ad_fast is INCREASING then
   IPA is NONE.
If am_slow is COOL and ad_slow is INCREASING or
   if am_fast is COOL and ad_fast is INCREASING then
   IPA is NONE.
If am_slow is COOL and ad_slow is STABLE or
   if am_fast is COOL and ad_fast is STABLE then
   IPA is NONE.
If am_slow is COOL and ad_slow is DECREASING or
   if am_fast is COOL and ad_fast is DECREASING then
   IPA is STRONG.
If am_slow is COLD and ad_slow is INCREASING or
   if am_fast is COLD and ad_fast is INCREASING then
   IPA is MODERATE.
If am_slow is COLD and ad_slow is STABLE or
   if am_fast is COLD and ad_fast is STABLE then
   IPA is STRONG.
If am_slow is COLD and ad_slow is DECREASING or
   if am_fast is COLD and ad_fast is DECREASING then
   IPA is STRONG.

The rules for determining icing potential due to road and air conditions in combination are as follows:

The output of ice potential due to road and air (IPRA) generated by block 102 can comprise one of three values:

1. STRONG
2. MODERATE
3. NONE

The particular rules for generating ice potential due to road and air are:

TABLE 4

Icing potential due to Air-Road Temperature

If pm_slow is WARM and am_slow is WARM or
   if pm_fast is WARM and am_fast is WARM then
   IPRA is NONE.
If pm_slow is WARM and am_slow is COOL or
   if pm_fast is WARM and am_fast is COOL then
   IPRA is NONE.
If pm_slow is WARM and am_slow is COLD or
   if pm_fast is WARM and am_fast is COLD then
   IPRA is STRONG.
If pm_slow is COOL and am_slow is WARM or
   if pm_fast is COOL and am_fast is WARM then
   IPRA is NONE.
If pm_slow is COOL and am_slow is COOL or
   if pm_fast is COOL and am fast is COOL then
   IPRA is MODERATE.
If pm_slow is COOL and am_slow is COLD or
   if pm_fast is COOL and am_fast is COLD then
   IPRA is STRONG.
If pm_slow is COLD and pm_fast is COLD
   then IPRA is STRONG.

The ultimate ice danger decision is accordingly based on the results of examining each input from blocks 100, 102 and 104, wherein each input may comprise the value of NONE, meaning no ice danger from that particular factor; MODERATE, indicating that the ice danger is moderately high from that particular factor and STRONG, which indicates that there is a high likelihood of icing based on that determined factor. The ultimate output of whether icing danger is NONE, WARNING, or DANGEROUS is determined experimentally based on the various factor inputs. Alternatively, the system may be adaptive wherein when in particular driving conditions which are known to be icy or not icy, the operator may press a control which indicates the current condition and the system and stores that information to assist in future iciness determinations.

The final output of overall icing potential (IP) produced by block 106 can be one of the following values:

Ice danger is a. NONE b. WARNING c. DANGEROUS

In the embodiment employing the display indicator of FIG. 7, a DANGEROUS result may be conveyed to the vehicle operator by blinking the indicator on and off at a rapid rate. On the other hand, if icing potential is only WARNING, the indicator may be lighted in a continuous manner. Finally, if the icing potential is determined to be NONE, the indicator is left unlighted.

The rules for generating the final icing potential decision are as follows:

|   | IPA | | IPR | | IPRA | | IP |
| --- | --- | --- | --- | --- | --- | --- | --- |
| a. | NONE | and | NONE | and | X | then | NONE |
| a. | NONE | and | MODERATE | and | X | then | NONE |
| a. | NONE | and | STRONG | and | X | then | WARNING |
| a. | MODERATE | and | NONE | and | NONE | then | WARNING |
| a. | MODERATE | and | NONE | and | MODERATE | then | WARNING |
| b. | MODERATE | and | NONE | and | STRONG | then | DANGEROUS |
| a. | MODERATE | and | MODERATE | and | NONE | then | WARNING |
| a. | MODERATE | and | MODERATE | and | MODERATE | then | WARNING |
| b. | MODERATE | and | MODERATE | and | STRONG | then | DANGEROUS |
| a. | MODERATE | and | STRONG | and | X | then | DANGEROUS |
| a. | STRONG | and | NONE | and | NONE | then | WARNING |
| a. | STRONG | and | NONE | and | MODERATE | then | WARNING |
| b. | STRONG | and | NONE | and | STRONG | then | DANGEROUS |
| a. | STRONG | and | MODERATE | and | NONE | then | WARNING |
| a. | STRONG | and | MODERATE | and | MODERATE | then | WARNING |
| b. | STRONG | and | MODERATE | and | STRONG | then | DANGEROUS |
| a. | STRONG | and | STRONG | and | X | then | DANGEROUS |

It will be understood that in certain cases, the input value based on combined air and road factors (denoted by an "X" in the logic table) from block 102 is not considered, because the air and road factors alone are sufficient to determine icing imminence.

As mentioned hereinabove in conjunction with FIG. 8, the presence of amplifier 93 enables some compensation for dirtying of the window in the sensor body. A passive version of this compensation circuitry relies on averages or trends of the input signals of the sensor and as the signal value coming from the sensor begins to degrade or change, the microprocessor will direct amplifier 93 to increase its gain to provide a stable signal. Referring now to FIG. 15 and FIG. 8 together, an embodiment according to the present invention provides an active contamination sensor system to actively detect contamination on window 30' of the sensor. A focusing element or lens 31' is provided in this embodiment which includes an active emitter 110 disposed centrally of the lens (alternatively it may be positioned at the side as a side emitter 110'). At selected times, microprocessor 82 will direct the emitter 110 or 110' to emit a pulse, suitably of visible light or the like or alternatively of infrared energy, and, given the orientation of the emitter towards the window, the resulting visible or infrared energy from the emitter will be directed towards window 30', the bulk of which energy will pass through the window. However, as the exterior surface 112 of the window becomes contaminated, for example by road spray or dust, an increased amount of energy from emitter 110 will be reflected back off of the window up towards detector 114. This increased reflection will result in a pulse signal from the sensor/detector 114, and microprocessor 82 will interpret this increased pulse to indicate that the window has become more contaminated. Accordingly, amplifier 93 may be appropriately adjusted to provide a consistent signal from the detector. During operation, the microprocessor will either regularly or randomly pulse the emitter 110 to continuously measure and detect the degree of contamination on window 112. At some point, as window 112 becomes excessively contaminated, the accuracy of the detector may become seriously impaired. Accordingly, the microprocessor can generate a cleaning signal to indicate to the operator or observer of the display that window 112 has become excessively contaminated and requires cleaning. Such a clean signal can be, for example, an intermittent flashing of the indicator 78 of FIG. 7.

Figure 16:
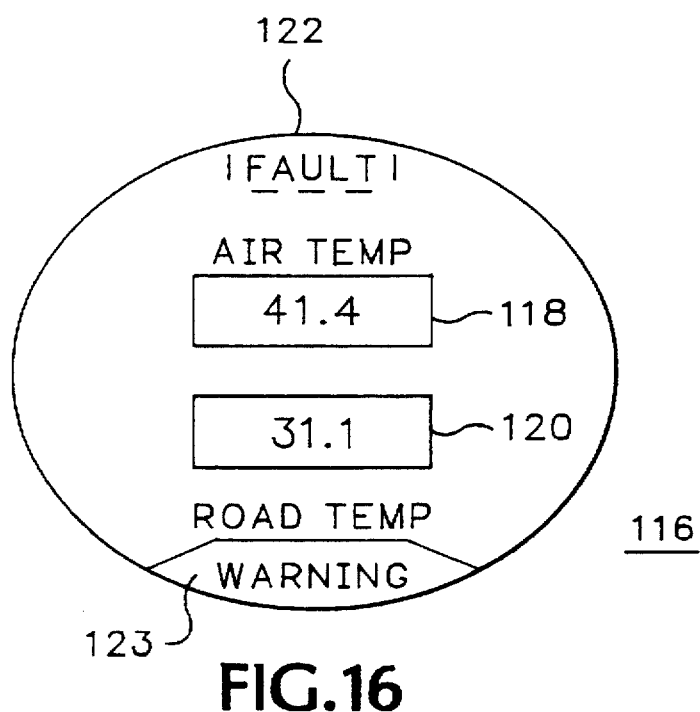
FIG. 16 is view of a preferred display in accordance with the present invention.

Referring to FIG. 16, which is a view of a preferred display panel in accordance with the present invention, the display 116 provides a greater degree of information than the display of, for example, FIG. 7, as may be desired by a professional truck driver, where the driver desires more detailed information from the sensor. In the display of FIG. 16, two display regions 118 and 120 are provided wherein region 118 displays the air temperature as measured by the ambient temperature sensor 36, for example and region 120 which displays the road temperature as detected by infrared sensor in conjunction with the ambient temperature sensor and as accordingly processed by the processing circuitry. A further indicator 122 provides an indication of fault, which is suitably illuminated or otherwise activated when, for example, the active contamination circuitry determines that the window 112 has become excessively obscured by contamination. Also, in the event of some other type of failure of the infrared sensor, for example by loss of signal from the sensor, the fault indicator may also be illuminated to advise the operator that some general failure or impairment of the instrument has occurred. Warning indicator 123 is illuminated in the event that icing is determined to be likely.

In operation of a system according to the present invention, stray radiation from outside the field of view of the detector can strike the detector via reflection or the like causing error in displayed output. A cylindrical extension tube provided over the detector window, can block some radiation, but increases the length of the instrument. Accordingly, with reference to FIG. 14, an improved external radiation shield is employed in a particular embodiment of the invention wherein the length of the shield is such that it is contained entirely within the focal length of the instrument behind window 30', for example. The shield comprises a series of stepped surfaces which define concentric rings of decreasing diameter, with the widest diameter at the window and the narrowest diameter at the body detector 114. The concentric ring portions comprise first portions 124 which are essentially perpendicular to the plane of window 30' wherein the widest diameter portion 124 is connected to the next most wide portion via a sloped concentric portion 126. Portion 126 slopes inwardly such that successive perpendicular portions 124 are of increasingly lesser diameter. Portion 124 is at an angle $\theta_1$ to the surface of the plane of window 30', wherein as noted hereinabove $\theta_1$ is approximately 90°. The sloped concentric portion 126 is an angle $\theta_2$ to portion 124, suitably 45°, and provides shielding against extraneous radiation from reaching the detector. This shielding is provided since, as indicated by ray 128, any stray radiation entering the window 30' into the interior chamber of the detector is likely to strike a particular sloped concentric portion 126 which, since it is sloped at the particular angle $\theta_2$, will cause the incoming stray radiation to be reflected back outwardly, back through the window 30, rather than enabling it to strike the detector 114. Accordingly, improved selectivity is provided, enabling the bulk of stray radiation to be effectively diverted from the detector. While the radiation shield of the embodiment of FIG. 14 is contained within the focal length behind window 30', an alternate embodiment external radiation shield on the outside of the window may also be employed. The radiation shield on the outside of the detector can take the form of a tube extension having a series of stepped interior surfaces in corresponding fashion to those of the shield of FIG. 14.

The imminent icing condition enunciator according to the present invention is also adaptable for other applications. For example, the invention is suitably useful in aircraft applications, wherein the runway surface conditions may be instantaneously communicated to a pilot prior to and upon landing, enabling the pilot to be aware of whether icing may be present on the runway surface to avoid surprise from unanticipated runway icing.

By revising the optical focusing from the sensor of the present invention and changing the I/R filter element to not exclude water vapor, the sensor will detect imminent icing conditions in flight. Accordingly, an improvement is provided over the outside air temperature sensor. When the aircraft is in clear air, the signal from the sensor of the present invention drops off. Temperature data is displayed only when the aircraft has penetrated an environment of cloud, fog, rain, ice or snow. This is very useful information during a night flight, for example, when pilots are unable to assess icing conditions.

When icing conditions are imminent, the in-flight icing detector of the present invention will provide warning to the pilot or crew. Aircraft de-icing equipment can then be activated early rather than later when icing becomes noticeable and accumulation is in process. Early de-icing is advantageous since de-icing requires aircraft engine power at a time when maximum engine power use is important as ice deposits can begin to degrade the intended wing lift-to-drag ratio.

Other environmental factors may also be sensed and factored into the decision making process. For example, the presence of moisture can be detected and used to further govern the resultant icing potential determination. In automobiles, the presence of moisture on a roadway is detected by a change in audible noise from the vehicle tires. Digital signal processing of an audio input to the microprocessor of FIG. 8 is one method of accomplishing this.

Figure 17:
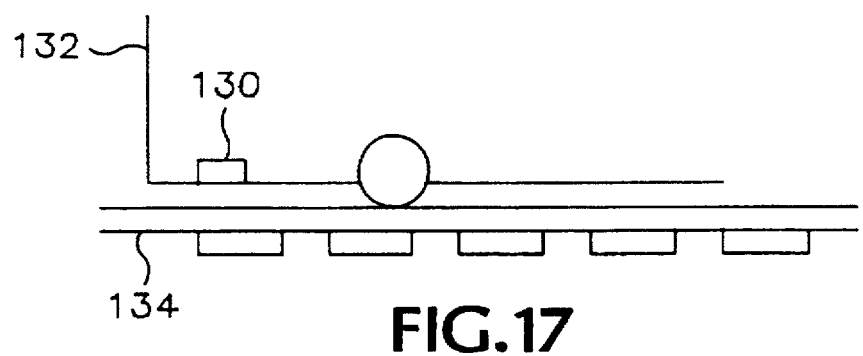
FIG. 17 is a schematic view of a sensor according to the present invention used in conjunction with a rail system application.

FIG. 17 is a schematic illustration of yet another application of the detector according to the present invention. In FIG. 17, sensor 130 is mounted within locomotive 132 (shown generally) wherein the sensor is oriented to detect the infrared radiation from rail 134. Accordingly, the temperature of the rail 134 is suitably determined and may be conveyed to the rail operator. The operator can then take appropriate action if it is determined that the temperature of the rail is below freezing and moisture is present so that sanding may be provided to ensure that traction is maintained. Alternatively, corrective action can be automatically initiated, by activation of the external device control line 167 (FIG. 18). Such corrective action may comprise activation of a rail sanding machine or the like. Further, in warm seasons or climates, it is possible to determine whether the rail is excessively warm so as to provide potential early warning that the rails may be warped sufficiently to increase the likelihood of derailing.

Other advantages provided in accordance with the present invention are that the infrared temperature compensation sensor is also advantageously employed to drive the air temperature display provided to an operator. Accordingly, the ambient temperature circuit as required by the infrared sensor, serves double duty, both providing temperature compensation to the infrared sensor and also providing air temperature measurement. The temperature sensor is also suitably mechanically bonded to the infrared detector, to create a single combined sensor component while ensuring that the thermal equilibrium between the two elements is obtained, reducing the likelihood that a temperature differential will exist between the two and that inaccurate readings would thereby be obtained.

The microprocessor further includes signal processing to remove any "picket fence" effect caused by shadows or slush on the road way which could result in the visual display rapidly changing, which would be annoying to an operator. Accordingly, high frequency changes in the sensor input are filtered and averaged, while biasing towards a lower temperature, to quickly report freezing temperature information. In addition to using an audio input to receive and match signature noise from the tires under specific conditions (i.e. dry, wet, slush, etc.), an ambient light sensor may also be employed to determine whether the vehicle is operating in sunshine, shade or night conditions. Thus the audio sensor, the ambient light sensor, the air temperature sensor and the road temperature sensor inputs are all suitably employed to provide an icing forecast.

While plural embodiments of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. An imminent icing detector for determining icing conditions of a surface comprising:
   infrared sensing means for detecting ambient infrared emissions from the surface and determining the likelihood of icing conditions of the surface based on the received detected ambient infrared emissions;
   means for detecting obstruction of the infrared sensing means by contamination; and
   amplification means for providing increased amplification of a signal from said sensing means in response to detection of an increase in obstruction by said detecting means.

2. An imminent icing detector for determining icing conditions on a road surface comprising:

infrared sensing means for detecting ambient infrared emissions from the surface and for determining the likelihood of icing conditions of the surface based on the received detected ambient infrared emissions, wherein said infrared sensing means comprises an infrared sensor and an ambient temperature compensation sensor, wherein said ambient temperature compensation sensor is employed for calibration of said infrared sensor and is further employed to display an ambient air temperature; and ambient light detection means for determining the level of sunlight present, wherein the detected level of sunlight is also employed to determine the likelihood of icing conditions.

3. An imminent icing detector according to claim 2 wherein said infrared sensor and said ambient temperature sensor are physically bonded to one another to provide efficient temperature correlation therebetween.

4. An imminent icing detector according to claim 2 further comprising an audio detector for determining environmental noise conditions, wherein said determined environmental noise conditions are further employed to assist in determining the likelihood of icing conditions on the surface.

5. An icing detector comprising:

an imminent icing detector including an infrared sensing means for determining the likelihood of icing conditions on a surface; and means for controlling a peripheral device based on the determination of the likelihood of icing conditions, wherein said peripheral device comprises a sanding device.

* * * * *